United States Patent [19]
Cutts et al.

[11] Patent Number: 5,744,043
[45] Date of Patent: Apr. 28, 1998

[54] PROCESSES FOR REDUCING CONTAMINATION OF CELLULOSIC LIQUORS

[75] Inventors: Paul Kenneth Cutts, West Yorkshire; Anthony John Burke, North Yorkshire, both of United Kingdom

[73] Assignee: Allied Colloids Limited, West Yorkshire, United Kingdom

[21] Appl. No.: 684,054

[22] Filed: Jul. 22, 1996

Related U.S. Application Data

[63] Continuation-in-part of PCT/GB95/02696, Nov. 16, 1995.

[30] Foreign Application Priority Data

Nov. 21, 1994 [GB] United Kingdom .................. 9423452

[51] Int. Cl.$^6$ .................................................. C02F 1/56
[52] U.S. Cl. ............................ 210/705; 162/5; 162/189; 162/199; 162/DIG. 4; 210/727; 210/733; 210/734; 210/928
[58] Field of Search ............................ 162/5, 8, 166, 162/167, 189, 199, DIG. 4; 210/725, 727, 728, 732, 733, 734, 917, 928, 705

[56] References Cited

U.S. PATENT DOCUMENTS

| | | | |
|---|---|---|---|
| 3,992,249 | 11/1976 | Farley | 162/72 |
| 4,720,346 | 1/1988 | Flesher et al. | 210/734 |
| 4,968,435 | 11/1990 | Neff et al. | 210/734 |
| 5,132,023 | 7/1992 | Kozakiewicz et al. | 210/928 |
| 5,380,444 | 1/1995 | Ryan et al. | 210/734 |
| 5,431,783 | 7/1995 | Honig | 162/164.1 |
| 5,433,824 | 7/1995 | Richardson | 162/8 |
| 5,435,922 | 7/1995 | Ramesh et al. | 210/928 |
| 5,512,184 | 4/1996 | Ryan et al. | 210/734 |

FOREIGN PATENT DOCUMENTS

| | | |
|---|---|---|
| 0 114 478 | 12/1983 | European Pat. Off. . |
| 0 464 993 A1 | 5/1991 | European Pat. Off. . |

Primary Examiner—Peter A. Hruskoci
Attorney, Agent, or Firm—Sughrue, Mion, Zinn, Macpeak & Seas, PLLC

[57] ABSTRACT

Stickies derived from pulping or deinking of cellulosic material are controlled by adding to the cellulosic liquor containing the stickies an emulsion in water of cross-linked, insoluble, ionisable and swellable polymer particles.

16 Claims, No Drawings

PROCESSES FOR REDUCING CONTAMINATION OF CELLULOSIC LIQUORS

RELATED APPLICATIONS

This application is a continuation-in-part of the US designation of PCT/GB95/02696 filed Nov. 16, 1995 by the present applicants and their assignee.

Deinking processes using the emulsions described herein, and certain novel emulsions, are described in PCT/GB95/02697, WO96/16223 and U.S. application Ser. No. 08/685,921 filed by John O. Stockwell et al even date herewith and commonly assigned.

BACKGROUND TO THE INVENTION

This invention relates to the minimisation of "stickies" problems associated with cellulosic liquors in paper-making (including making paper board) and deinking processes.

It is well known that paper-making liquors, including deinking liquors, tend to become contaminated with colloidal hydrophobic material which has a tendency to aggregate and be deposited as sticky residues. These residues may be deposited on apparatus utilised for handling the liquor and/or in paper (or paper board) made from the liquor.

The stickies may originate from the original pulping operation and be due either to naturally sticky material in the fibres that are being pulped (e.g., wood or preeviously formed paper, including paper board) or may be generated by interaction between the fibres and chemicals used in the pulping process. Alternatively, the stickies may be caused by a deinking process. For instance deinking often involves exposing cellulosic material to alkaline conditions and this can generate colloidal hydrophobic stickies material.

Various treatments are known for minimising stickies contamination. For instance it is known to treat a thick stock with bentonite for this purpose. Bentonite is a naturally occurring material of variable quality. It would be desirable to be able to achieve reduction of stickies contamination using synthetic material of controllable quality. It will also be desirable to obtain better results than are obtainable using bentonite.

It is also known to use various polymers. Examples are low molecular weight coagulants and the polymers mentioned in U.S. Pat. Nos. 5,433,824, 5,368,694, 5,292,403, 5,246,549 and 4,184,912 and EP-A-280445 and 464993.

There remains a need for a different and improved, cost effective, reproduceable method of controlling stickies.

SUMMARY OF THE INVENTION

According to the invention, we reduce contamination in a cellulosic liquor due to stickies material derived from pulping or deinking of cellulosic material by a process comprising mixing collector particles with the liquor, and in this process the collector particles are polymer particles provided as an emulsion of the polymer particles in water wherein the polymer is formed of a water insoluble monomer blend comprising a) at least 20% by weight hydrophobic monomer having a solubility in water of below 5g/100 cc at 20° C.

b) at least 10% by weight of a hydrophilic ionisable monomer that is preferentially soluble in the monomer blend when substantially non-ionised but is preferentially soluble in water when ionised c) 0 to 50% by weight of a non-ionisable hydrophilic monomer that is preferentially soluble in the monomer blend and which has a solubility in water of above 5 g/100 cc at 20° C.

d) 0.05 to 1ot cross-linking agent and in which the proportions of a, b, c and d are such that an aqueous composition, formed by blending 3% (dry weight polymer) of the emulsion in water with acid or alkali to ionise monomer (b) is a fluid composition which contains the polymer in swollen particulate form.

DESCRIPTION OF PREFERRED EMBODIMENTS

The pH of the liquor during the process (i.e., at the time of adding the emulsion and collecting the colloidal particles onto the polymer particles) is often near neutral (for instance around pH 6 to 8) but in some instances the liquor may be more acidic (for instance down to pH 4 or even pH 3) or may be more alkaline (for instance up to pH 9 or even pH 10.5).

An advantage of the invention is that, by appropriate choice of the components of the polymer, it is possible to optimise the polymer for whatever pH environment exists during the process.

The polymer should substantially retain its particulate form during the process so that the stickies, which include colloidal stickies, can be collected onto the particles. The proportions of the monomers should therefore be selected such that this is achieved. In particular, sufficient cross linking agent should be included to ensure that the particulate nature is substantially maintained. If the amount of cross linking agent is too low, the polymer may fully dissolve in use and this is undesirable.

Whether or not the particles do substantially retain their particulate form can be estimated by observing viscosity.

Preferably the polymer emulsion is such that, when blended with water to provide a 3% composition and adjusted to the pH prevailing in the process, that composition would give a viscosity below 50,000, preferably below 10,000 and most preferably below 2,000 cps measured by a Brookfield RVT Viscometer. Generally the viscosity is between 50 and 1000 cps. However in some processes it is possible to use polymers that would give viscosities above 100,000 cps provided the polymer is added as a composition having a concentration such that it can conveniently be utilised in the process.

The polymer is preferably such that it has a particle size, at the pH prevailing in the process, of below 15 μm and most preferably below 10 μm, with best results generally being obtained when the particle size is below 5 μm, especially below 3 μm. It is usually above 0.1 μm and preferably above 0.3μm.

The polymer particles swell as units of monomer (b) ionise. The emulsion is generally made by emulsion polymerisation at a pH at which the units of monomer (b) are substantially non-ionised and in this state the polymer preferably has a particle size below 0.μm, most preferably below 0.3 μm. It is usually above 0.02 μm, and generally above 0.05 μm. It is generally preferred that, at the pH prevailing in the process, the particle size is generally at least about 1.5 times, and often at least 2.5 times the unswollen particle size. Normally it is not more than about 5 or 8 times the unswollen particle size but useful results can still be obtained with higher degrees of swelling, for instance up to 15 or 20 times. All particle sizes defined herein are the particle size (i.e., diameter) as determined by laser light scattering, of 95% by weight of the particles. Thus typically the particles may swell from a size of 50 to 300 nm up to a size of 300 to 1500 nm.

It is necessary to include sufficient cross linking agent to prevent total solubilisation of the particles and in particular to control the particle size in use to the desired size, and to minimise viscosity increase. Generally the amount of cross linking agent is at least 0.1% and usually at least 0.2% (2,000 ppm) by weight. Such polymers are useful especially when the process is conducted at a substantially neutral pH such that the monomer (b) only becomes partly ionised. For instance the process may be conducted at a pH of around 6.5 to 8 using a polymer which has the desired particle size under these conditions but which would swell further if the pH was higher (e.g., pH 10) or lower (e.g., pH 3).

Preferably, however, the polymer is made using proportions of cross linking agent and other monomers such that it does only swell up to 15 or 20 times its unswollen diameter, preferably up to 8 times its unswollen diameter, when it is fully ionised. Such a polymer can then be used in the process without risk of the polymer dissolving or providing too high a viscosity if the pH of the process is particularly high or particularly low.

Such polymers are obtained using higher amounts of cross linking agent, usually at least 0.5% and typically 1 or 2% to 5% by weight. The amount of cross linking agent and proportions of other monomers are selected such that the polymer has the required relatively low swelling rate and the required relatively low viscosity for a 3% composition when exposed to sufficient alkali or acid to achieve maximum potential swelling of the polymer (e.g., pH 3 or pH 10).

The polymer emulsion is preferably made by conventional oil-in-water emulsion polymerisation of the monomer blend at a pH at which monomer (b) is substantially unionised and the resultant polymer is substantially unionised and unswollen, so that the monomer (b) is preferentially soluble in the monomer blend at this pH. However, upon adjusting the pH of the final composition to a pH at which the monomer would have ionised, the polymer swells.

The monomers are usually all ethylenically unsaturated monomers.

By referring to the monomers as being preferentially soluble in the monomer blend we mean that the monomers dissolve in the oil phase of the oil-in-water emulsion polymerisation mixture is preference to the water phase sufficient that there is substantially no polymerisation of monomer in the water phase.

The oil-in-water emulsion polymerisation is conducted at the polymerisation pH, which is the pH which the hydrophilic ionisable monomer is non-ionised and is preferentially soluble in the monomer blend and typically this is in the range 2 to 11.

When the monomer (b) is anionic (generally a carboxylic monomer) the polymerisation pH should normally be acidic, typically around 2 to 5 or 6, and the resultant polymer will swell when the pH is subsequently adjusted to being alkaline, typically above 7, for instance 7.5 or 8 to 10.

When monomer (b) is cationic (generally an amino monomer) the polymerisation pH is generally alkaline typically 8 to 10 often around 9, and the polymer can then be put into its fully swollen state in an acidic medium, typically pH 4 to 6.

The amount of hydrophobic monomer (a) is generally 20 to 80%. Normally it is above 40%. Generally it is below 70% and often below 60%. An amount of around 50% is often preferred.

The amount of the hydrophilic ionisable monomer (b) is generally 10 to 80% by weight. The amount typically is at least 20% and is usually at least 30% and often at least 40%. If too much is included it may be difficult to select a monomer (a) that will prevent the monomer (b) dissolving into the aqueous phase and so generally the amount of monomer b is below 60%. Amounts of around 50% are often preferred.

Monomer (c) is optional but can be included, if desired, to improve hydrophilic properties without increasing pH sensitivity. Generally the amount is below 30%, usually below 10% and usually the monomer is omitted.

The amount of cross-linker is generally above 0.1%. The amount depends upon the relative proportions of the monomers (a), (b) and (c). Increasing the amount of (b) tends to increase the amount of cross-linker (d) that is required, in order to resist excess swelling. Conversely, increasing the amount of monomer (a) tends to reduce the amount of cross-linker (d) that is required. The amount is preferably sufficiently high that substantially no polymer can be dissolved from the polymer particles. Thus preferably the soluble fraction is below 1% measured by gel content.

The hydrophobic monomer (a) must have solubility in water of below 5 gg/100 cc at 2° C. and this solubility is normally substantially independent of the polymerisation pH and so the hydrophobic monomer will generally have this low solubility value throughout, for instance, the pH range 2 to 10. Preferably the solubility of the hydrophobic monomer in water is even lower, for instance below 1.5 g/100 cc.

The solubility of any non-ionisable hydrophilic monomer (c) is generally any value greater than the maximum defined solubility for the hydrophobic monomer and is typically is above 10 g/100 cc at 20° C. but usually is not more than 200 g/100 cc at 20° C. These solubilities will normally be substantially independent of pH.

The polymerisation is an addition polymerisation involving ethylenically unsaturated monomers. It is generally conducted so that the molecular weight, in the absence of cross-linking agent, would be in the range 100,000 to 500,000 measured by gel permeation chromatography.

The hydrophobic monomer (a) can be any of the monomers conventionally utilised for copolymerisation with ethylenically unsaturated carboxylic monomers in oil-in-water emulsion polymerisation. Thus they may be selected from alkyl (meth) acrylates, styrenes, vinyl esters, acrylonitriles, associative monomers (for instance acrylic esters or allyl ethers having a pendant polyethoxy chain terminated with a hydrophobic group such as fatty alkyl or alkaryl or aralkyl) or vinyl ethers. The preferred monomer (a) is selected from styrene and alkyl (meth) acrylate wherein the alkyl groups are generally C1 to 8 but can be fatty alkyl. The preferred monomer (a) is ethyl acrylate but other suitable monomers include styrene, methyl acrylate, butyl acrylate. Blends of monomer (a) can be used.

The ionisable monomer (b) is usually an ethylenically unsaturated carboxylic acid or amine. Suitable carboxylic acids are methacrylic acid, acrylic acid, itaconic acid, crotonic acid, maleic acid (or anhydride). The, preferred acid is methacrylic acid. Suitable ionisable amines are monoalkyl and dialkyl aminoalkyl (meth) acrylates and dialkyl aminoalkyl (meth) acrylamides. Typical materials are dimethyl aminoethyl (meth) acrylates.

Non-ionisable hydrophilic monomer (c) can be, for instance, a hydroxy alkyl (meth) acrylate, typically hydroxyethyl (meth) acrylate.

The cross-linker (d) can be any oil-soluble polyethylenically unsaturated cross-linker or other cross-linker suitable for causing cross-linking during oil-in-water emulsion polymerisation. Typical materials are divinylbenzene, diallyl phthalate, and di, tri, and tetrafunctional (meth) acrylates. The preferred material is diallyl phthalate (DAP).

The oil-in-water emulsion polymerisation is preferably conducted in such a way that the polymer particles formed by the emulsion polymerisation have a dry size (as determined by laser light scattering) below 0.5 µm and generally below 0.3 µm and preferably above 0.02 µm, typically 0.05 to 0.2 µm. Thus at least 90% by weight, often at least 95% and preferably at least 100% by weight of the particles have such a size.

The emulsion polymers may be made by broadly conventional oil-in-water emulsion polymerisation techniques suitable for making the desired particle size. Thus typically a monomer blend is formed and is emulsified into water at the polymerisation pH in the presence of a suitable emulsifier. The emulsifier typically is of the anionic class, preferably a fatty alcohol ethoxylate sulfate. The amount of emulsifier typically is around 3%. Emulsification may be achieved by homogenising the monomer blend in the water containing the emulsifier in conventional manner.

Polymerisation may be initiated by including typically water soluble initiators such as ammonium persulphate.

The polymerisation is preferably conducted at a temperature of at least 70° C. but usually below 90° C. The polymerisation normally continues for a period of 1 to 3 hours. If desired, monomer may be fed into the polymerisation mixture during polymerisation.

The total amount of polymer in the final polymer emulsion is generally in the range 20 to 40% by weight. When all the monomer is in the emulsion before polymerization, the amount will therefore preferably be within the same range.

It will be appreciated that the polymer particles have hydrophobic and hydrophilic components and can thus be regarded as amphipathic. It seems that the hydrophobic components of the polymer particles can interact with the colloidal stickies materials, probably because of the hydrophobic nature of these, so as to cause the particulate stickies to be collected by the polymer particles, thus forming aggregates.

The formation of these aggregates may be sufficient to reduce contamination in any particular environment in that it may, for instance, prevent contamination of a liquor prior to it being passed on to some other process, where the risk of contamination may be less or may be reduced by some additional treatment.

Generally, however, it is desirable either to fix the aggregated stickies on to cellulosic fibres in the liquor or to separate the aggregated stickies from the liquor, for instance by flotation, sedimentation or filtration.

When the polymer is cationic, the aggregates of stickies and polymer particles may be sufficiently cationic to be substantive to cellulosic fibres in the liquor and so may fix on to the fibres without additional treatment, especially when the fibre content is relatively high, for instance above 0.1%. However substantivity of the aggregates to the fibres can be improved by incorporating cationic polymeric material in the liquor before or after adding the particulate polymeric material. This is particularly desirable when, as is normally the case, the particulate material is anionic.

Instead of fixing the stickies on to cellulosic fibres in the liquor, it can be desirable to remove the stickies from the liquor, and removal of the collected stickies can be promoted by adding a water soluble coagulant or flocculant to the liquor before, or more usually after, adding the particulate polymeric material. Generally this coagulant or flocculant is counter-ionic to the particulate polymeric material. Generally the particulate material is anionic and the coagulant or flocculant is cationic.

Preferred processes according to the invention comprise utilising anionic particulate polymer for collecting the stickies and a low molecular weight cationic coagulant for fixing the stickies on to fibres or for rendering the stickies cationic so as to promote their removal from the liquor by, for instance, sedimentation or filtration or flotation. Typically the cellulosic content of the suspension is below 2%. In some instances it can be desirable to add a flocculant, generally a cationic flocculant, in order to further improve this removal by sedimentation, filtration or flotation.

The cationic coagulant can be an inorganic coagulant such as a polyvalent metal salt (for instance alum) but is preferably a cationic polymeric material. Typically this has molecular weight below 2 million and often below 1 million (measured by gel permeation chromatography). Expressed in terms of intrinsic viscosity (measured by a suspended level viscometer at 25° C. in 1N sodium hydroxide buffered to pH 7.5) of below 3 dl/g and often below 1.5 dl/g.

The coagulant can be any of the conventional cationic coagulants such as a polyethylene imine, a polyamine (for instance a condensate of a diamine with epichlorhydrin) and polymers of ethylenically unsaturated cationic monomer, optionally copolymerised with up to 50% other monomer, generally acrylamide or other non-ionic monomer. Suitable cationic monomers are diallyl dialkyl quaternary salts, especially diallyl dimethyl ammonium chloride (DADMAC), and dialkylaminoalkyl (meth) -acrylate or -acrylamide generally as acid addition or quaternary ammonium salts. An example is the quaternary salt of dimethylaminoethyl (meth) acrylate. The cationic monomer is preferably at least 80% by weight of the monomers used for forming the polymer, and generally it is 100%. A preferred material is poly DADMAC.

If flocculant is used, it is generally a material having intrinsic viscosity above 4, and often above 6, dl/g. It can be a non-ionic acrylamide or an ionic acrylamide, for instance a copolymer of acrylamide with a suitable amount of sodium acrylate or one of the cationic monomers listed above.

One liquor to which the invention can be applied is a wash liquor from a deinking process. Deinking processes comprise forming a pulp and subjecting the pulp to a separation process by which ink particles are separated from the pulp, for instance by washing or flotation. The liquor treated in the invention can be the wash liquor that was used to remove ink particles from the pulp (often after filtration or other separation of the ink particles from the liquor) or it can be liquor which is drained from the deinked pulp.

The invention is of particular value in such processes where the deinking pulping process is conducted under alkaline conditions, for instance at pH 8 to 10.5, often 9 to 10.5, since these alkaline conditions can promote the release of colloidal stickies from the cellulosic material.

The wash liquors from the deinking process (i.e., the liquors used for washing the pulp during the process or separated from the pulp after the process) generally have a cellulosic content in the range 0.01 to 1% by weight. When using the invention for the treatment of such liquors, it is normal to remove the collected stickies, with some or all of this cellulosic content, from the liquor by a flotation or sedimentation process, with the removal being promoted by the addition of coagulant, generally after the addition of the collector particles.

It should be noted that the invention does not extend to a deinking process as such, namely a process in which the polymer particles are incorporated in the pulper or otherwise in the deinking process in order to promote the removal of ink from the pulp. The ink particles at this stage would not be regarded as stickies. Preferably therefore stickies removed by the process of the invention are stickies which do not originate from a pulping process which is conducted for the purpose of deinking.

The invention is also of value for treatment of the stickies contamination derived from pulping cellulosic material, especially when repulsing paper or board. For instance, stickies contamination due to adhesives (e.g., the adhesives on labels or packaging tape or fluting adhesives) can be a serious problem when repulping old corrugated containers (i.e., OCC pulping). Accordingly the particulate polymeric material can be added during the pulping process to the pulping liquor or, more usually, can be added to thick stock or thin stock or white water (i.e., recycled drainage water) or during the manufacture of paper (including paper board) made from the pulped or repulped material. In such processes it is generally desirable to fix the stickies and the particulate polymer on to the fibres in the white water, thin stock or thick stock either by relying on the use of cationic polymer particles or by the addition of cationic coagulant before, or more usually after, the addition of the polymer particles. When the liquor is white water, the concentration of cellulosic material is generally 0.01 to 1%. When the liquor is thin stock the concentration is generally 0.2 to 2% and when the liquor is thick stock or thick stock component the concentration is generally 1.5 to 5%.

The dosage of the particulate material will normally be in the range 1 to 50 ppm based on the total weight of the liquor or 1 to 5000 ppm, often 50 to 1000 ppm, based on the cellulosic content of the liquor. The emulsion is generally added after dilution to a polymer concentration of 0.005 to 0.5%, often 0.01 to 0.1% polymer.

The amount of cationic polymeric coagulant that is used is generally in the range 1 to 200 ppm active polymer (based on the weight of liquor) or 1 to 2000 ppm, often 20 to 1000 ppm based on cellulosic fibres.

The following are examples of the invention.

EXAMPLE 1

This demonstrates the production of the polymer emulsion.

A monomer feed is formed from 155 parts by weight ethyl acrylate, 155 parts by weight methacrylic acid and 5.9 parts by weight (about 2%) diallyl phthalate. This monomer feed is homogenised with 310 parts by weight water, 5.7 parts by weight of a 27% solution of the sodium salt of a sulphated ethoxylated $C_{12-14}$ fatty alcohol surfactant and 0.1 parts by weight sequestering agent. The resultant emulsion together with a solution of 30 parts water and 0.55 parts ammonium persulphate are fed gradually to a solution of 360 parts water 5.75 parts of the surfactant, 0.1 part sequestering agent and 0.38 parts ammonium persulphate over a period of about 90 minutes while maintaining the polymerisation mixture at about 85° C. The polymerisation mixture is maintained at that temperature for about an hour and then cooled.

The product emulsion has a polymer content of about 30% by weight. If necessary, it may be filtered to remove coarse particles. The emulsion as made has a particle size range (determined by laser light scattering) of 95% by weight of the particles about 100 nm (0.1 μm).

When the emulsion is diluted with water to a 3% solids content at pH 8 the particle size is at least 95% about 3 μm and the viscosity is about 150 cps measured by a Brookfield RVT Viscometer.

When the process is repeated with different amounts of cross linker, the unneutralised emulsion particle size remains constant (with a mean of around 0.1 μm) but the neutralised, swollen, particle size varies according to the amount of cross linker, as shown in the following table which gives approximate mean particle sizes at different amounts of cross linker after neutralising to above pH 8:

TABLE 1

| Cross linker % | 0.25 | 0.5 | 0.75 | 1 | 2 | 5 |
|---|---|---|---|---|---|---|
| Swollen size (μm) | 1.3 | 1 | 0.6 | 0.65 | 0.3 | 0.36 |

The polymers shown in Example 1 having high degrees of swelling in alkali (generally made with cross linker amounts of 0.25% and below, are commercially available as thickeners. The polymers having higher amounts of cross linking are novel materials. Because of their low swelling properties, they are not useful as thickeners.

EXAMPLE 2

In order to demonstrate the ability of the polymer emulsion to remove stickies, a laboratory experiment was carried out using a polymer emulsion in accordance with Example 1 (using 1.9% DAP) in a laboratory experiment.

A cellulosic fibre suspension was produced to generate a paper pulp thick stock. The thick stock comprised only the fibre fraction from a 2% consistency board stock plus the filtrate obtained from a 2% consistency label stock. Filtrate contained fibrous fines and filler, both having dimensions less than 75 μm, as well as the attendant dissolved and colloidal material including stickies. The experiment was conducted at natural pH and ambient temperature.

The emulsion was added as a dilute suspension (0.3% polymer concentration) to the thick stock and stirred for five minutes, whereupon a solution of cationic polymeric coagulant was added and stirred for five minutes prior to separating the stock components by filtration through a dynamic drainage jar. The cationic polymeric coagulant that was used was poly diallyl dimethyl ammonium chloride solution.

The filtration had the effect of separating the fibre fraction from filtrate containing fibrous fines, filler, and dissolved and colloidal material including stickies. The turbidity of this filtrate was measured (with the results expressed in FTU). The filtrate was then centrifuged to separate fibrous fines and filler from the dissolved and colloidal material and the centrate containing the dissolved and colloidal material was assessed for Total organic Carbon (with the results expressed as TOC in mg/l).

The results are set out in Table 1, in which the dosages of emulsion and coagulant solution are expressed as a percentage based on fibre.

TABLE 1

| Emulsion | Coagulant | Turbidity (FTU) | TOC (mg/l) |
|---|---|---|---|
| 0 | 0 | 155 | 1570 |
| 1 | 0 | 128 | 1530 |
| 0 | 0.8 | 138 | 1560 |
| 0.6 | 0.8 | 88 | 1500 |
| 1.0 | 0.8 | 73 | 1490 |
| 1.6 | 0.8 | 82 | 1485 |
| 0 | 1.6 | 122 | 1480 |
| 0.6 | 1.6 | 90 | 1450 |
| 1.0 | 1.6 | 77 | 1480 |
| 1.6 | 1.6 | 80 | 1420 |

This clearly demonstrates the benefit of including the defined emulsion in the process.

EXAMPLE 3

This is an example of a recycled pulp deinking process carried out in the normal fashion by high consistency pulping followed by screening and cleaning of the thick stock followed by flotation deinking to provide a reject fraction containing the ink and an underflow, thin stock screening and cleaning and wash deinking. The underflow from the flotation deinking and thin stock cleaning is passed, through a centrifugation step, to a point where, in the invention, the emulsion is added, and the treated liquor is then blended with the wash deinking underflow. The resultant mixed liquor, containing the emulsion particles, is then dosed with a cationic polymeric coagulant (a poly DADMAC solution polymer) and subsequently with a high molecular weight flocculant, and is then subjected to dissolved air clarification. The turbidity of the accept fraction from the dissolved air clarifier was measured.

The results are shown in Table 2.

TABLE 2

| Collector Particle (ppm) | Cationic Coagulant (ppm) | Flocculant (ppm) | Clarifier Accepts (FTU) |
|---|---|---|---|
| 0 | 3.4 | 6.1 | 18.3 |
| 1.7 | 3.4 | 6.1 | 18.1 |
| 1.7 | 3.4 | 6.1 | 17.0 |
| 10.1 | 4.5 | 6.1 | 16.9 |
| 10.1 | 4.5 | 4.5 | 17.3 |
| 8.1 | 4.5 | 4.5 | 17.7 |

Again, the lower turbidity value obtained when the emulsion of Example 1 is used demonstrates the improved performance.

EXAMPLE 4

A mill trial was conducted utilising the general process described in Example 3 and it was found that, when utilising broadly equivalent amounts of the same cationic coagulant and flocculant, the additional use of the emulsion of Example 1 was capable of giving a significant reduction in percent TOC.

We claim:

1. A process for reducing contamination in a cellulosic liquor due to stickies material derived from pulping or deinking of cellulosic material, the process comprising mixing with the liquor an effective stickies-removing amount of an emulsion in water of particles of collector polymer which ionize in the liquor and which is formed of a water insoluble monomer blend comprising
   a) at least 20% by weight hydrophobic monomer having a solubility in water of below 5 g/100 cc and which is selected from the group consisting of alkyl(meth) acrylates, styrenes, vinyl esters, acrylonitriles, vinyl ethers, and ethylenically unsaturated monomers having a polyethoxy chain terminated with a hydrophobic group,
   b) at least 10% by weight of a hydrophilic ionizable monomer that is soluble in the monomer blend when substantially non-ionized but is soluble in water when ionized and is selected from the group consisting of ethylenically unsaturated carboxylic acids and amines,
   c) 0 to 50% by weight of a non-ionizable hydrophilic monomer that is soluble in the monomer blend and which has a solubility in water of above 5 g/100 cc, and
   d) 0.05 to 10% oil soluble polyethylenically unsaturated cross-linking agent and in which the proportions of a, b, c and d are such that an aqueous composition, formed by blending 3% (dry weight polymer) of the emulsion in water with acid or alkali to ionize monomer (b) is a fluid composition which contains the polymer in swollen particulate form.

2. A process according to claim 1 in which the liquor is a thick stock, thin stock or white water from a paper-making process.

3. A process according to claim 1 in which the liquor is pulping liquor in which the cellulosic material is pulped.

4. A process according to claim 1 in which a water soluble coagulant or flocculant is added to the liquor.

5. A process according to claim 4 in which a coagulant is added to the liquor and the coagulant is selected from polyamines, polyethylene imines and copolymers of 80 to 100% ethylenically unsaturated cationic monomer with 0 to 20% ethylenically unsaturated non-ionic monomer.

6. A process according to claim 1 in which the polymeric particles are anionic and water soluble cationic coagulant is subsequently added to the liquor.

7. A process according to claim 1 in which the emulsion has an unswollen particle size 0.02 to 0.5 µm and a particle size at the pH prevailing in the pulp which is at least 1.5 times the unswollen particle size and is 0.1 to 5 µm.

8. A process according to claim 1 in which 3% (dry weight of polymer) of the polymer emulsion gives a viscosity, at the pH prevailing in the pulp, of below 10,000 cps measured by a Brookfield RVT viscometer.

9. A process according to claim 1 in which the amount of cross linking agent is at least 0.5% by weight of the monomers.

10. A process according to claim 1 in which the amount of monomer (a) is 40 to 70%, the amount of monomer (b) is 30 to 60%, and the amount of monomer (c) is 0 to 30% and each of monomers (a), (b) and (c) are ethylenically unsaturated.

11. A process according to claim 1 in which monomer (c) is a hydroxyalkyl(meth)acrylate.

12. A process for reducing contamination in a cellulosic liquor due to stickies material derived from pulping or deinking of cellulosic material, the process comprising mixing with the liquor an effective stickies-removing amount of an emulsion in water of particles of collector polymer which ionize in the liquor and which is formed of a water-soluble monomer blend comprising
   a) 40% to 70% by weight hydrophobic monomer having a solubility in water of below 5 g/100 cc and which is selected from the group consisting of alkyl(meth) acrylates, styrenes, vinyl esters, acrylonitriles, vinyl ethers, and ethylenically unsaturated monomers having a polyethoxy chain terminated with a hydrophobic group,
   b) 30 to 60% by weight of a hydrophilic ionizable monomer that is soluble in the monomer blend when substantially non-ionized but is soluble in water when ionized and is selected from the group consisting of ethylenically unsaturated carboxylic acids and amines,
   c) 0 to 30% by weight of a hydroxyalkyl(meth)acrylate monomer,
   d) 0.5 to 10% oil soluble polyethylenically unsaturated cross-linking agent and in which the proportions of a, b, c and d are such that an aqueous composition, formed by blending 3% (dry weight polymer) of the emulsion in water with acid or alkali to ionize monomer (b) is a fluid composition which contains the polymer in swollen particulate form which is ionized, and wherein the size of the ionized polymer particles is 2.5 to 20 times the size of the un-ionized polymer particles.

13. A process according to claim 12 in which the liquor is wash water from a deinking process.

14. A process according to claim 12 in which the stickies collect with the polymer particles and are removed from the liquor by sedimentation, filtration or flotation.

15. A process according to claim 12 in which the size of the ionized polymer particles is 2.5 to 8 times the size of the un-ionized polymer particles.

16. A process according to claim 12 in which the size of the ionized polymer particles is at least 2.5 times the unswollen size, the unswollen size being 50 to 300 nm and the swollen size being 300 to 1500 nm.

* * * * *